Sept. 2, 1941. J. W. HOGG Re. 21,892
CHARGE FORMING DEVICE
Original Filed March 26, 1934 2 Sheets-Sheet 1
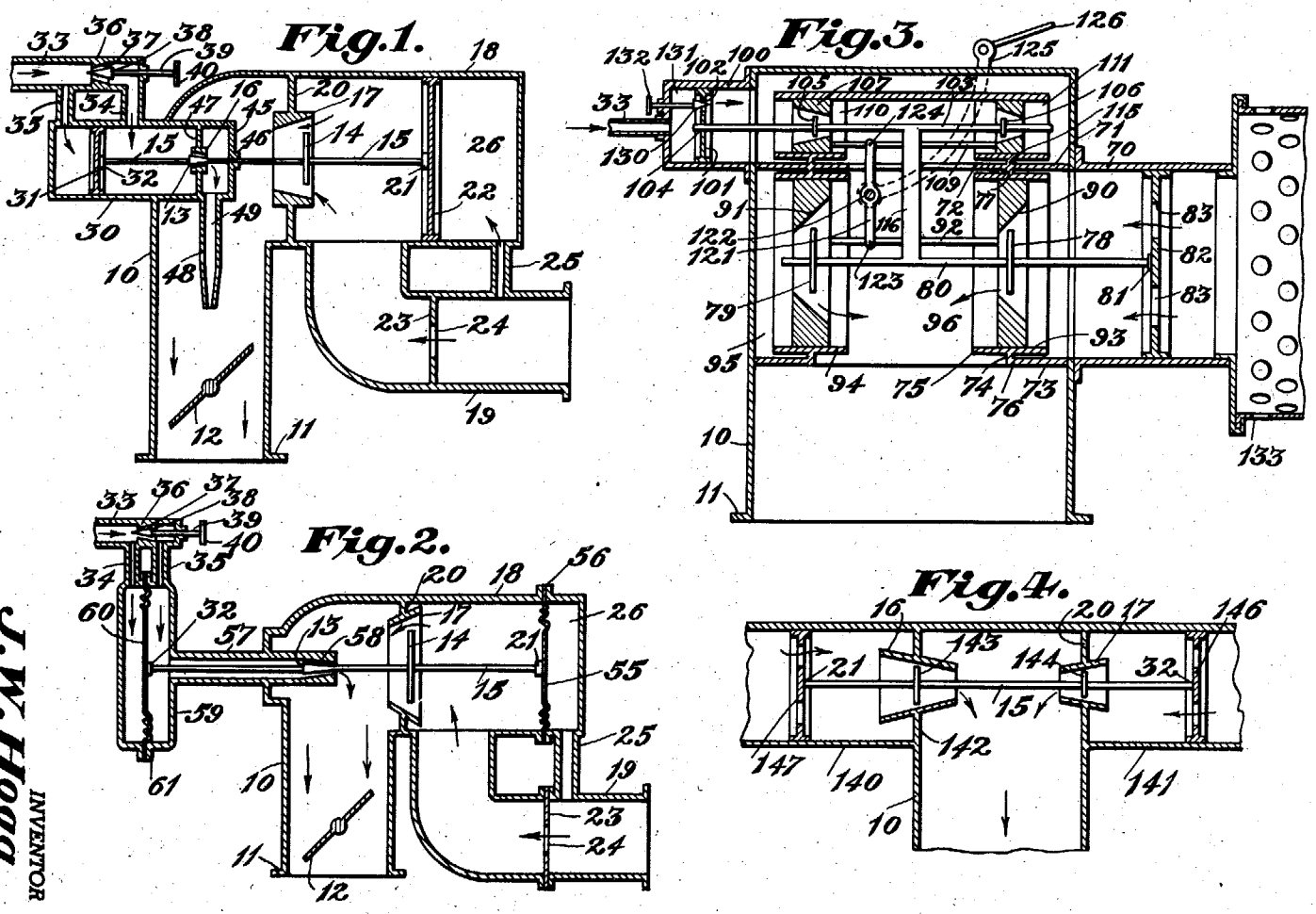
INVENTOR
J. W. Hogg
BY
A. R. McCrady
ATTORNEY Sept. 2, 1941. J. W. HOGG Re. 21,892

CHARGE FORMING DEVICE

Original Filed March 26, 1934 2 Sheets-Sheet 2

INVENTOR
J. W. Hogg
BY A. R. McCrady
ATTORNEY

Reissued Sept. 2, 1941

Re. 21,892

UNITED STATES PATENT OFFICE 21,892

CHARGE FORMING DEVICE

John Webb Hogg, Llanerch, Pa., assignor to Bendix Aviation Corporation, South Bend, Ind., a corporation of Delaware Original No. 2,004,869, dated June 11, 1935, Serial No. 717,476, March 26, 1934. Application for reissue June 25, 1940, Serial No. 342,390

13 Claims. (Cl. 261—50)

This invention relates to charge forming devices; and it comprises apparatus for supplying and mixing two fluids in fixed relative proportion, and more particularly to apparatus for supplying to an internal combustion engine, fuel and air in predetermined relative proportion and in variable total volume, said apparatus comprising a variable opening valve adapted to control a flow of fuel and a variable opening valve adapted to control a flow of air, the two valves being operatively interconnected, means for establishing a differential pressure in the fuel flow and means for establishing a differential pressure in the air flow, means adapted to respond to said fuel flow differential pressure and means adapted to respond to said air flow differential pressure, each of said pressure responsive means being adapted to operate the valves, means for combining the two flows, and throttling means for varying the total amount of combined flow; all as more fully hereinafter set forth and as claimed.

In many chemical processes and operations it is necessary to mix two different fluid flows, such as gases or liquids, in fixed relative proportion, under varying rates of combined flow. In many cases the pressure on the two component fluids fluctuates, as by variations in hydrostatic head, in pump pressure, etc. It has been a desideratum to provide a simple means for automatically proportioning and mingling two component fluids in constant relative proportion, independently of fluctuations in pressure in either component fluid or of fluctuations in the total amount of combined flow.

The present invention provides simple means adapted to automatically mix two fluids in constant proportion. While it is of general application, it will be described in a particular application: embodied in a carburetor for internal combustion engines.

In the internal combustion engine art it is customary to supply to the cylinders air and a flow of fuel, which may be gas, gasoline or oil. When liquid fuels are used, it is usual to provide for spraying or vaporizing the fuel before it reaches the cylinders. Various types of carburetors and mixing valves have found use for performing these functions. In general they comprise, in the case of gasoline motors, an air conduit leading to the intake of the cylinders, and means for introducing liquid gasoline into air flowing through the conduit. The conduit is usually provided at some point with a venturi or other means for producing an area of reduced pressure, that is high suction; and the gasoline is introduced at this point, as by a jet or jets. In the usual carburetor some sort of throttle device for the air-gasoline mixture is provided: a butterfly valve or the like.

In many cases it is desirable to provide a substantially constant proportion of gasoline and air at different throttle openings and at different rates of air flow; that is at different engine speeds and loads. The simplest form of carburetor, comprising merely a gasoline jet opening into the air intake conduit, while it may be designed so as to deliver the correct mixture for one given engine speed, does not then provide uniform proportioning at different loads and speeds. At increased engine speeds, the flow of air into the engine increases, but the proportional amount of gasoline taken up by the air increases faster than the rate of air flow. Hence, with this sort of elementary carburetor, if it is adjusted correctly for medium speeds then at high speeds it will deliver a mixture too rich in gasoline. This defect is inherent in the simple type of carburetor described.

Most modern carburetors for variable speed engines represent additions to, or modifications of, this elementary form of carburetor, with the object of adapting it to deliver a more or less constant mixture at all speeds. In some types, an auxiliary air valve is provided, adapted to open to a greater or less degree at higher engine speeds to dilute the over-rich mixture furnished by the jet. Some types make use of metering pins, valves in the fuel line linked to the throttle, or multiple gasoline jet devices in which different numbers of jets are thrown into action at different engine speeds; all with the idea of securing correct proportioning under different speeds and loads.

None of these devices is entirely satisfactory in operation. In carburetors of the simple air valve type, for example, having a spring-restrained flapper-valve adapted to be opened under intake suction, the mixture is by no means constant at different speeds. There is apt to be an abrupt change in proportioning when the spring comes into action; and moreover the nature of the restraining force exerted on the air valve by a cylindrical coil spring is such that the air valve opening is not strictly correct except at one given speed. Attempts have been made to control the air valve by means of double springs, tapered springs, etc. but these are still not satisfactory in insuring correct proportioning and moreover are likely to get out of adjustment.

According to the present invention I provide a carbureting device adapted in its basic form to automatically supply to an engine a constant ratio of air to gasoline under different loads, different speeds, and different pressures in the fuel line and air intake. I do this by providing linked valves in the fuel inlet line and in the air intake conduit, pressure responsive means in the fuel line and the intake conduit, and means whereby the pressure responsive means control the valves according to pressures in the fuel line and the intake conduit.

The present invention also contemplates a carburetor for internal combustion engines including an air conduit delivering to a mixing chamber in communication with the engine intake, a fuel conduit delivering fuel at a jet in the mixing chamber, means for establishing differential pressure in each conduit, a variable opening valve in the fuel conduit, means responsive to the differential pressure in the fuel conduit and operatively connected to the valve to reduce the valve opening on increase in differential pressure in the fuel conduit, and means responsive to differential pressure in the air conduit and operably connected to the valve to increase the opening of the valve on increase in differential pressure in the air conduit.

While, as stated, my device in its basic forms is adapted to deliver a constant mixture under all conditions, it is readily adaptable to provide a different proportioning in some parts of the operating range, as for example to supply a slightly leaner mixture at high engine speeds and thus secure economy. The new device is simple but presents several advantages over ordinary carburetors. The device employs no float bowl and is able to function properly in any position. Moreover it is well adapted for use in conjunction with a supercharger. Hence it is well suited for aircraft engine carburetion.

In the accompanying drawings I have shown several forms of a specific embodiment of my invention.

Fig. 1 is a view in vertical section of a carburetor for liquid fuels;

Fig. 2 is a view in vertical section of a modified form of carburetor;

Fig. 3 is a view in vertical section of a modified form of carburetor employing sliding seats;

Fig. 4 is a view in vertical section of a modified form of mixing device;

Figure 5:
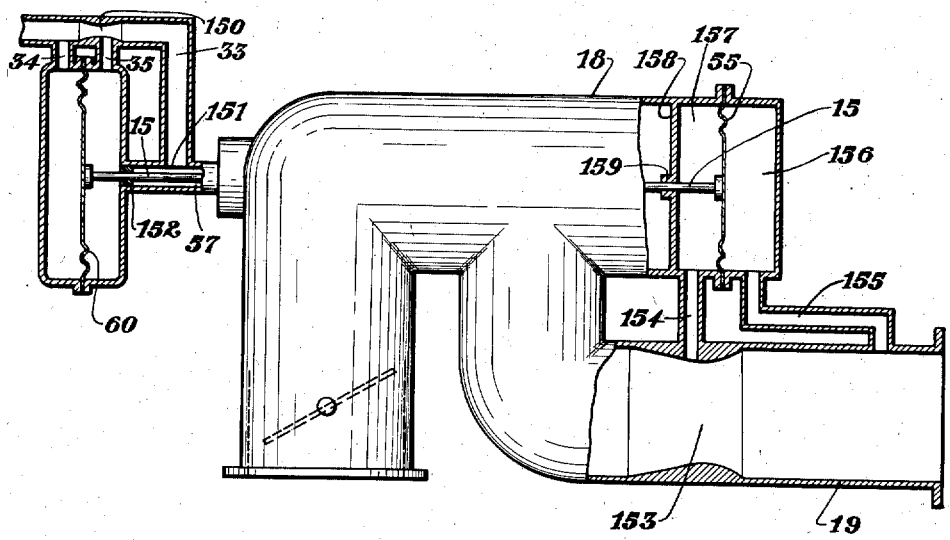
Fig. 5 is a view partly in vertical section and partly in elevation of a modified form of carburetor employing Venturi differential pressure establishing means.

In the drawings, in which like reference characters indicate like parts throughout, Fig. 1 shows a carburetor device comprising a mixing chamber 10 adapted to be attached by means of a flange 11 to the intake manifold (not shown) of an internal combustion engine. A throttle valve 12 of the ordinary butterfly type is mounted in the chamber as shown. Other forms of throttling devices may be employed. The flow proportioning means comprises a valve 13 for fuel and a valve 14 for air. The two valves are mounted on a single shaft 15 as shown and cooperate with conical seat members 16 and 17. The mixing chamber is merged, as shown, with a cylinder 18 communicating with an intake conduit 19 for air. Seat 17 is mounted in the cylinder by means of a partition 20 as shown. One end of shaft 15 is attached as at 21 to a piston 22 adapted to slide freely in cylinder 18 while maintaining a relatively leak-proof seal. A partition or plate 23 having a restricted orifice 24 is mounted in the intake conduit as shown. The restricted orifice produces a differential pressure across the partition, when air is flowing through the conduit. A conduit 25 connects the space 26 in the cylinder behind the piston with the intake conduit before the orifice, as shown. The conduit puts one side of the piston in communication with the high pressure (inlet) side of the orifice, while the other side of the piston is in communication with the low pressure side of the orifice. The differential pressure across the orifice, and hence across the piston, will be proportional to the square of the velocity of the fluid passing through the orifice.

A second cylinder 30 is mounted in the mixing chamber as shown, in opposed relation to cylinder 18. A piston 31 attached as at 32 to the other end of shaft 15 is adapted to slide freely, but without substantial leakage, in cylinder 30. Fuel enters the cylinder on one side of the piston through a fuel inlet conduit 33 and inlet 34, and on the other side of the piston through an inlet 35. A partition 36 having a conical restricted orifice 37 is positioned in the fuel inlet line between inlets 34 and 35, as shown. With this arrangement, when fuel enters inlet 33 under pressure and flows across orifice 37 a differential pressure is set up across piston 31. The differential pressure is proportional to the square of the velocity of the entering flow of fuel. A tapered pin 38 cooperating with orifice 37 is provided for regulating the differential pressure across the orifice. The tapered pin is mounted on a threaded shaft 39 rotatably mounted in the inlet line as shown and provided with a handle 40 by which the tapered pin can be secured to different positions in the orifice. One end of cylinder 30 projects into the mixing chamber as shown. The cylinder is capped as at 45 and a small orifice 46 is provided fitting shaft 15 closely while allowing free motion thereof. Seat 16 is mounted in the cylinder by means of a partition 47. An elongated nipple 48 is mounted on the end of the cylinder, projecting into the mixing chamber as shown, and in communication with the cylinder beyond partition 47. The nipple is provided with a narrow bore 49.

In operation, air flows into the mixing chamber through conduit 19 and valve and seat 14, 17; either under engine suction or under pressure as by a blower or super-charger. Fuel is supplied to inlet 33 under pressure, as from a pump or from an elevated source of supply, and enters the mixing chamber through orifice 37, inlet 34, valve and seat 13 and 16, and bore 49. In the air side of the carburetor, a differential pressure is set up across orifice 24 and the pressure on the right hand side of the orifice being greater, pressure in space 26, in communication with intake 19 through conduit 25, tends to force the piston 22 to the left, partially closing the air intake past valve and seat 14 and 17. At the same time, a differential pressure is set up across fuel conduits 34 and 35 by means of orifice 37, and pressure to left of piston 31 tends to move the piston to the right, partially closing the fuel flow through valve and seat 13 and 16. According to the invention the size of cylinders 18 and 30 of orifices 24 and 37, and of the fuel and air valves is so proportioned that when fuel and air are supplied under normal relative flows the tendency of the air piston, under differential pressure in the air flow, to move shaft 15 in one direction, is exactly counterbalanced by the tendency of the fuel piston, under differential pressure in the fuel flow, to move the shaft in the opposite direction. As one valve closes the other opens until the opposing forces acting on the two pistons are equal, at which time a definite proportional flow will be maintained. As a result, under normal conditions the coupled valves remain in a definite relative position such as that shown in Fig. 1. At this time the differential pressures in the two flows and on the pistons are in general not equal. In the balanced position, the pressures on the pistons are only equal when the two pistons are made the same size. But the opposing forces exerted by the two pistons are equal and balanced. The tapered pin in the fuel line permits the differential fuel pressure across piston 31 to be adjusted; and hence the relative proportion of fuel and air.

If the suction in air intake conduit 19 is increased, as by an increase in engine speed on opening the throttle, the pressure differential across orifice 24 will increase, increasing the pressure in space 26 and moving the piston 22 and hence shaft 15 slightly to the left. This cuts down the air flow slightly and opens fuel valve 13 slightly, thereby admitting more fuel into the increased air flow.

Similarly, if the pressure in the fuel line increases, the fuel valve 13 will partly close and the air valve will open, admitting more air and thus keeping the proportions constant. The throttle valve 12 allows the total combined flow to be regulated.

This embodiment of the invention is well adapted for use in aircraft engines, which are ordinarily equipped with a fuel pump and a supercharger. The device dispenses with float bowls, vacuum tanks, etc., and is thus capable of functioning satisfactorily in any position. The fuel injection nipple 48 is short and fine-bored; thus neither gravity nor suction in the air intake near the nozzle has any appreciable effect on the rate of introduction of fuel.

Fig. 2 represents a modified form of carbureting device in which the pistons are replaced by diaphragms. This construction presents some advantages in that diaphragms are free from friction. As shown, the air side of the carburetor is similar to that in Fig. 1, except that piston 22 is replaced by a corrugated, flexible metal diaphragm 55 fixed in the cylinder as at 56 and centrally attached to shaft 15 as at 21. On the fuel side, cylinder 30 is replaced by an injection nozzle 57 mounted in the mixing chamber as shown and provided with a tapered orifice 58 cooperating with valve 13 as shown. The nozzle is in communication with a diaphragm chamber 59 containing a diaphragm 60 mounted therein as at 61 and centrally attached to shaft 15 at 32. Inlet 35 is in communication with one side of the diaphragm and inlet 34 with the other side. The rest of the device of Fig. 2 is similar to Fig. 1. The operation is the same and requires no further explanation.

Fig. 3 shows a modified form of carbureting device having balanced valves, in which the throttling is effected by shifting the valve seats and which also has provision for changing the relative proportions of fuel and air in certain parts of the operating range. As shown, the device comprises a cylindrical mixing chamber 10 with flange 11. The air side of the device comprises a cylinder 70 mounted on the mixing chamber as shown. A separator disk 71 having a circular orifice 72 is mounted in the mixing chamber as shown, and a similar separator disk 73 having a circular orifice 74 is mounted in the chamber below the first disk and adjacent the lower rim of cylinder 70 as shown. A vertical cylinder 75 is positioned concentrically within the mixing chamber, as shown, joining the edge of orifice 74 as at 76 and joining the upper disk 71 as at 77. The air valve is a balanced valve comprising two discoid valve members 78 and 79 mounted on a shaft 80 attached as at 81 to a sliding piston 82 adapted to slide freely in cylinder 70. The piston is orificed as at 83: in this embodiment the differential pressure is established by means of orifices in the piston itself. The valve members 78 and 79 cooperate with two conically orificed seat members 90 and 91. These seat members are coupled together by means of a rod 92 as shown, and are adapted to slide in two cylindrical slides or ways 93 and 94. It is seen that the valves are in communication with an annular space 95 bounded by the outer wall of cylinder 75, the inner wall of chamber 10, and separators 71 and 73; and in communication with an inner cylindrical space 96 in the cylinder 75. Air passes into the mixing chamber through valve and seat 78, 90 and through valve and seat 79, 91.

In the fuel side of the carburetor, the arrangement is similar. A cylinder 100 is mounted in the mixing chamber as shown. A piston 101 orificed as at 102 slides in the cylinder. The piston is attached to a shaft 103 as at 104. Two discoid valve members 105 and 106 are mounted on the shaft as shown and cooperative with two sliding seats 107 and 108, which are coupled together by a rod 109. The seats are adapted to slide in cylindrical ways 110 and 111 which are mounted in a cylinder 115 similarly to the arrangement of the air valves. Fuel is admitted to cylinder 100 through inlet 33. Valve shaft 103 and 80 are coupled or attached to each other by a bar 116 so that movement of either shaft is directly communicated to the other shaft. The sliding seats, coupled by rods 92 and 109, are adapted to be moved from outside by means of a rotating lever 121 pivoted in the walls of cylinder 75 and the mixing chamber by a rod 122 and pivotally attached to rods 92 and 109 as at 123 and 124. The outer end of rod 122 carries an arm 125 adapted to be operated by throttle rod 126 as shown. Movement of the arm is thus communicated to rods 92 and 109 and allows the seats to be shifted from outside, with respect to the discoid valve members.

In operation when arm 121 is in a certain position the valve seats and the valve members are in a definite position, that of the valve members being determined by the pressures in fuel inlet 33 and air inlet cylinder 70 as in the other embodiments. Throttling is performed by moving arm 125. If the arm is moved to the left for example, all the valve seats are brought slightly nearer the valve members, throttling the flows of fuel and air.

As stated, it is often desirable to provide for richer or leaner mixtures than are theoretically correct, in certain parts of the operating range. In Fig. 3 I have shown how the device may be modified to provide this. As shown, a tapered or graduated pin 130 is mounted in cylinder 100 by means of the threaded rod 131 carrying a handle 132 and cooperating with orifice 102 in piston 101. The tapered pin, which is stationary with respect to the orifice 102 is adapted to provide different effective orifice openings in different operating positions of the valve and piston linkage. If the fuel flow is, for example, under substantially constant pressure, as is the case when an ordinary vacuum tank fuel supply is used, and the air flow varies according to the throttle opening and engine speed, then different rates of air flow will produce different effective orifice openings in the fuel piston, and hence the opening of the fuel valve will change in such a way that different fuel-air proportions will be provided for different air flows. The proportions of fuel and air may be varied in any part of the range by providing the tapered pin with a suitable contour. In Fig. 3 the contour of the pin is such that movement of the valve linkage to the left under increased air flow cuts down the effective orifice at 102. The fuel pressure being assumed constant, the result is that under increased air supply the proportional fuel supply is slightly less than when a simple orificed piston, without tapered pin, is used. Thus a slightly leaner mixture will be provided under increased air flow; at higher engine speeds. In some cases it is desirable to have the tapered pin almost cylindrical, thereby producing but slight change in proportioning in different parts of the operating range. In some cases it is found convenient to have the taper of the pin reversed; that is, the large base of the pin is on the right of piston 101 and the smallest section is to the left.

I have shown cylinder 70 in communication with an air cleaner indicated diagrammatically at 133. The use of an air cleaner is desirable but is not essential.

The double valve arrangement shown for both fuel and air flows is to provide balanced valves. In the air valve for example flow in one direction through valve and seat 78 and 90 is balanced by flow in the opposite direction through valve 79 and seat 91. Thus there is no disturbing effect due to rush of air against the discoid valve members. The fuel valve arrangement is similar.

In Fig. 4 I have shown a simplified form of charge forming of mixing device adapted for use with gas engines, or for general fluid proportioning. As shown, the device comprises a mixing chamber 10 in communication with an inlet cylinder 140 for one fluid and an inlet cylinder 141 for another fluid. Two conical valve seat members 16 and 17 are mounted in the device by partitions 142 and 20 as shown. The valve assembly comprises two discoid valve members 143 and 144 mounted on the shaft 15 which is attached as at 32 to an orificed piston 146 sliding in cylinder 141 and attached at the other end as at 21 to an orificed piston 147 sliding in cylinder 140. The operation of the device is similar to that of Fig. 1.

Figure 6:
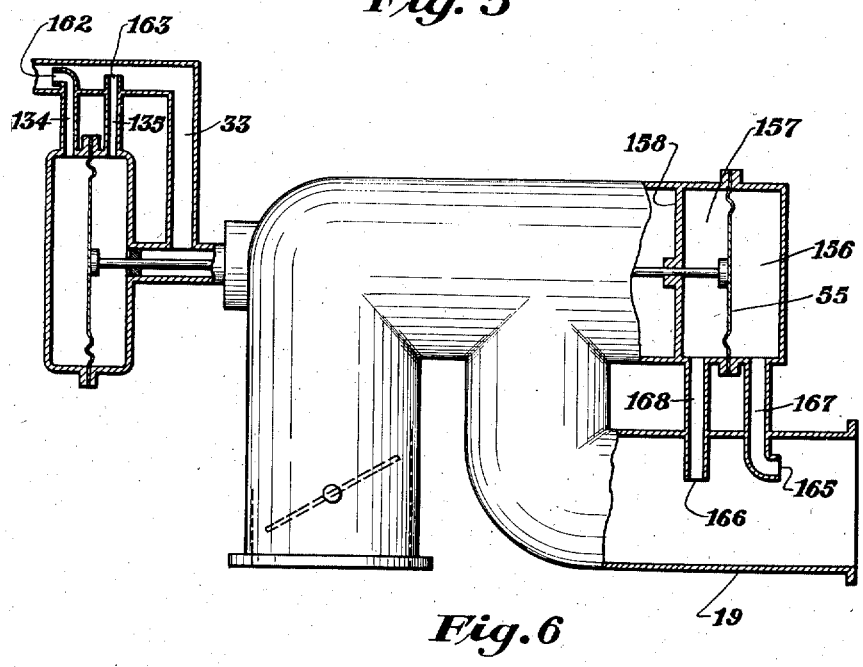
Fig. 6 is a similar view of a modification employing Pitot tube differential pressure establishing means.

Figs. 5 and 6 show embodiments of the invention similar to that of Fig. 2 but making use of Venturi and Pitot tubes respectively for the differential pressure establishing means. Thus in Fig. 5 the fuel conduit restriction 36 is replaced by a Venturi passage 150, to which the high and low pressure connections 34 and 35 are made as shown. The fuel conduit 33 is joined to passage 57 at 151, and a bored partition 152 separates the low pressure space at the right of diaphragm 60 from the passage 57. The air differential pressure establishing means comprises a venturi 153 disposed in an exactly similar manner. Conduits 154 and 155 connect the venturi 153 and the intake conduit 19 respectively with the chambers 156 and 157 to the right and left of diaphragm 55. A partition 158 separates the chamber 157 from the air passage 18 and is provided with a bearing 159 which closely receives the shaft 15 to prevent any substantial leakage therepast.

In Fig. 6 the high and low pressure fuel connections 134 and 135 terminate in a Pitot jet 162 and a static-pressure jet 163 as shown, and a similar arrangement and similar jets 165 and 166 are employed in the air conduit 19 as shown, connected through conduits 167 and 168 to the chambers 156 and 157 on opposite sides of the diaphragm 55. A partition 158 separates the low pressure side of the diaphragm from the air passage 18. The functioning of the apparatus of Figs. 5 and 6 is similar to that of Fig. 2 and requires no further description.

For the sake of clarity the invention has been shown diagrammatically. In devices constructed according to the invention the various parts are proportioned to suit the requirements of the installation for which the device is intended. The usual attachments for carburetors, such as choker valves, warmers etc., may be employed, these being omitted from the drawings for the sake of simplicity. Also the pressure responsive means in each device may be diaphragms, multi-convolution bellows or pistons, and the means for establishing differential pressures for operating the pressure means may be of the orificed partition, Venturi or Pitot tube type, as is convenient. The tapered pin valve in the fuel line can be mounted in such a way as to allow it to be temporarily retracted from the valve seat by a hand lever or other control means, to provide a temporary increase of the fuel flow as during starting up.

What I claim is:

1. Apparatus for mixing two fluids under pressure in constant relative proportion, comprising a conduit for each fluid, the conduits being in communication, a valve in each conduit, means coupling the valves together, means separate from said valves for establishing a substantial differential pressure in each fluid and means responsive to said differential pressure of each fluid and operatively connected to the valve for actuating the same.

2. Apparatus for mixing two fluids under pressure in constant relative proportion, comprising a conduit for each fluid, the conduits being in communication, a variable opening valve in each conduit, coupling means for the valves such that motion of one valve towards closed or open position respectively imparts motion to the other valve towards open or closed position respectively, means responsive to variations in pressure of the fluid in each conduit resulting from variations in the flow of fluid therethrough, said pressure responsive means being operatively connected to the valve coupling means whereby increase of flow in either conduit is adapted to partially close the valve in that conduit and to partially open the valve in the other conduit.

3. In a carburetor for an internal combustion engine a conduit for fuel and a conduit for air, a mixing chamber in communication with the conduits, a variable opening valve for each conduit adapted to control flows therein, coupling means for the valves, means separate from the valves for establishing a substantial differential pressure in each flow, means responsive to said differential pressure of fuel and of air in operative connection with the valves and means for varying the total combined flow from the mixing chamber.

4. Apparatus for delivering a flowing mixture of fuel and air to an engine in definite relative proportion and in variable total flow, comprising a conduit for fuel and a conduit for air, a mixing chamber in communication with said conduits, a variable opening valve in each conduit, coupling means for the valves such that motion of one valve towards closed or open position respectively imparts motion to the other valve towards open or closed position respectively, means responsive to variations in pressure of the fluid in each conduit resulting from variations in the flow of fluid therethrough, said pressure responsive means being operatively connected to the valve coupling means whereby increase of flow in either conduit is adapted to partially close the valve in that conduit and to partially open the valve in the other conduit and means for varying the total combined flow from the mixing chamber.

5. In a carburetor for internal combustion engines, a conduit for fuel and a conduit for air, a mixing chamber in communication with the conduits and adapted to deliver into the intake of the engine, balanced variable opening valve means for each conduit adapted to control the flows therein, said valve means comprising a pair of coupled movable members and a pair of seat members adapted to be shifted with respect to the valve members and cooperating with the valve members, means for passing a flow in one direction through one of the valves and seats and in the opposite direction through the other of the valves and seats, coupling means for the valve means for each conduit whereby motion of one valve member toward closed or open position respectively imparts motion to the other valve member toward open or closed position respectively, means responsive to variations in pressure of the fluid in each conduit resulting from variations in the flow of fluid therethrough, said pressure responsive means being operatively connected to the valve coupling means whereby increase of flow in either conduit is adapted to partially close the valve means for that conduit and to partially open the valve means for the other conduit and means for shifting the seat members with respect to the valves to provide throttling.

6. In a carburetor for internal combustion engines, a mixing chamber, means for conducting a flow of fuel to the mixing chamber, means in said conducting means adapted to establish a differential pressure in the fuel flow, means for conducting a flow of air to the chamber, means in said conducting means adapted to establish a differential pressure in the air flow, pressure-responsive means adapted to respond to the differential pressure in the fuel line and pressure-responsive means adapted to respond to the differential pressure in the air line, variable opening valve means in the fuel line and valve means in the air line, the valves being coupled together such that opening of one tends to close the other, the valves being operatively connected with the said pressure-responsive means, whereby the valves are moved to different relative positions of opening by the pressure-responsive means until the forces exerted by the two pressure-responsive means are equal, whereupon a definite flow proportioning is established.

7. Apparatus for supplying two flows of fluids under pressure in constant relative proportion comprising conduit means for each fluid, means in each conduit means adapted to establish a differential pressure in each flow, pressure-responsive means responsive to differential pressures in each conduit and variable opening valve means in each conduit coupled whereby opening of either valve tends to close the other, and so operatively connected to said valves that increase in the differential pressure in each conduit tends to close the valve in that conduit and to open the valve in the other conduit.

8. In a carburetor for internal combustion engines, a body member adapted for attachment to the intake of an engine and having an air passage extending therethrough to said intake, a liquid-fuel conduit terminating within said air passage for delivering fuel to the air flowing therethrough, a variable opening valve for controlling the fuel flow through said conduit, means for establishing a substantial differential pressure in the fuel conduit, means responsive to said differential pressure in the fuel conduit connected to said valve and adapted to urge the valve in a direction to decrease the fuel flow through the conduit upon increase in said differential pressure, means for establishing a substantial differential pressure in the air passage, a manually controlled throttle in the air passage posterior to the air differential pressure establishing means, for varying the quantity of air supplied to the engine during periods of engine operation and means responsive to the differential pressure in the air conduit connected to said valve and adapted to urge the valve in a direction to increase the fuel flow through the conduit upon increase in said air differential pressure whereby fuel-air proportioning in substantially constant ratio is secured.

9. In a carburetor for internal combustion engines, an air passage, a manually operated throttle in the passage for varying the quantity of air supplied to the engine during periods of engine operation, a liquid fuel conduit terminating in the passage for delivering fuel to the air flowing therethrough, a variable opening valve in the fuel conduit, means for establishing a substantial differential pressure in the fuel conduit anterior to said valve, means responsive to said differential pressure in the fuel conduit and operatively connected with the valve and adapted to reduce the opening of the valve on increase of differential pressure in the fuel conduit, means for establishing a substantial differential pressure in the air passage anterior to the throttle, and means responsive to said differential pressure in the air passage and operatively connected with the valve and adapted to increase the opening of the valve on increase of differential pressure in the air conduit.

10. In a carburetor for internal combustion engines a conduit for fuel and a conduit for air, a mixing chamber in communication with the conduits and adapted to deliver into the intake of the engine, a variable opening valve in the fuel conduit, area restricting means for establishing a differential pressure in the fuel conduit, means responsive to said differential pressure in the fuel conduit and operatively connected with the valve and adapted to reduce the opening of the valve on increase of differential pressure in the fuel conduit, means for establishing a differential pressure in the air conduit, means responsive to said differential pressure and operatively connected with the fuel valve and adapted to increase the opening of the valve on increase of differential pressure in the air conduit, and means responsive to at least one of said differential pressures for varying the effective area of the area restricting means.

11. In a carburetor for internal combustion engines, an air passage, a throttle controlling the passage and adapted to vary the quantity of air supplied to the engine during periods of operation, a liquid fuel conduit, a mixing chamber in communication with the air passage and fuel conduit and adapted to deliver into the intake of the engine, a variable opening valve in the conduit controlling the fuel flow therethrough, means for establishing a substantial differential pressure in the air passage anterior to the throttle, means for establishing a substantial differential pressure in the fuel conduit, and flexible diaphragms respectively responsive to said differential pressures in the air passages and fuel conduit and operatively connected with the fuel valve and adapted to increase the opening of the valve upon increase in the differential pressure in the air passage and to decrease the opening of the valve upon increase in the differential pressure in the fuel conduit.

12. In a charge forming device for an internal combustion engine, an air passage, a fuel conduit, a mixing chamber in communication with the air passage and fuel conduit and adapted to deliver into the intake of the engine, a throttle controlling said passage, a variable opening valve in the fuel conduit, area restricting means for establishing a differential pressure in the fuel conduit, means for establishing a differential pressure in the air passage anterior to the throttle, means responsive to said differential pressure in the fuel conduit and means responsive to said differential pressure in the air passage operatively connected to said valve and arranged so that an increase in the fuel differential will tend to decrease the fuel flow through the conduit and an increase in the air differential pressure will tend to increase the fuel flow through the conduit whereby the ratio of fuel and air supplied to the engine will be maintained substantially constant, and means responsive to at least one of said differential pressures for varying the effective area of said area restricting means whereby the ratio of fuel and air supplied to the engine may be varied.

13. The invention defined in claim 12 comprising in addition manually operable means for varying the effective area of said area restricting means to modify the ratio of fuel and air supplied to the engine.

JOHN WEBB HOGG.